United States Patent
Breunig et al.

(10) Patent No.: US 8,915,001 B2
(45) Date of Patent: Dec. 23, 2014

(54) DECORATIVE ELEMENT AND METHOD FOR PRODUCTION THEREOF AND METHOD FOR ACTUATING THE SAME

(75) Inventors: Steffen Breunig, Pforzheim (DE); Lutz Schmittat, Lohmar (DE)

(73) Assignee: Daimler AG, Stuttgart (DE)

( * ) Notice: Subject to any disclaimer, the term of this patent is extended or adjusted under 35 U.S.C. 154(b) by 676 days.

(21) Appl. No.: 13/262,283

(22) PCT Filed: Feb. 11, 2010

(86) PCT No.: PCT/EP2010/000862
§ 371 (c)(1),
(2), (4) Date: Sep. 30, 2011

(87) PCT Pub. No.: WO2010/118795
PCT Pub. Date: Oct. 21, 2010

(65) Prior Publication Data
US 2012/0032592 A1 Feb. 9, 2012

(30) Foreign Application Priority Data
Apr. 14, 2009 (DE) .......................... 10 2009 017 363

(51) Int. Cl.
| | |
|---|---|
| G09F 13/18 | (2006.01) |
| B60Q 3/00 | (2006.01) |
| B29C 45/16 | (2006.01) |
| B60Q 1/32 | (2006.01) |
| B60Q 3/04 | (2006.01) |
| B60R 13/02 | (2006.01) |
| B29C 45/14 | (2006.01) |
| B29L 31/30 | (2006.01) |

(52) U.S. Cl.
CPC ............ *B60Q 3/004* (2013.01); *B29C 45/1643* (2013.01); *B29C 45/1671* (2013.01); *B60Q 1/323* (2013.01); *B60Q 3/044* (2013.01); *B60R 13/02* (2013.01); *B29C 45/14688* (2013.01); *B29C 45/14778* (2013.01); *B29K 2995/0026* (2013.01); *B29L 2031/3005* (2013.01); *B60Q 2500/10* (2013.01); *B60R 2013/0281* (2013.01); *B60R 2013/0287* (2013.01)
USPC ............................................... 40/546; 40/591

(58) Field of Classification Search
CPC ....................................................... G09F 13/18
USPC ................................................... 40/546, 591
See application file for complete search history.

(56) References Cited

U.S. PATENT DOCUMENTS 4,965,950 A * 10/1990 Yamada .......................... 40/546
6,530,164 B2 * 3/2003 Gai ................................. 40/546

(Continued)

FOREIGN PATENT DOCUMENTS

| DE | 202004008681 U1 | 8/2004 |
| DE | 102004060810 A1 | 9/2006 |

(Continued)

*Primary Examiner* — Gary Hoge
(74) *Attorney, Agent, or Firm* — Patent Central LLC; Stephan A. Pendorf

(57) ABSTRACT

The invention relates to a decorative element (10) for a motor vehicle and to a method for producing the same. The decorative element (10) thereby comprises an at least partially transparent decorative film (12) applied to a flat carrier element (30) and back injection molded with two plastic layers (14, 16). At least the first plastic layer (14) is thereby at least partially transparent. The use of the first plastic layer (14) as an optical conductor is thereby made possible, allowing particularly optically attractive light coupling into the decorative element, and opening particularly extensive latitude in design.

11 Claims, 10 Drawing Sheets

(56) References Cited

U.S. PATENT DOCUMENTS

| | | | |
|---|---|---|---|
| 6,729,055 B2* | 5/2004 | Chou | 40/546 |
| 7,237,933 B2* | 7/2007 | Radu et al. | 362/488 |
| 7,588,357 B2 | 9/2009 | Onopa et al. | |
| 7,937,865 B2* | 5/2011 | Li et al. | 40/542 |
| 8,011,818 B2* | 9/2011 | Negley | 362/613 |
| 2004/0139636 A1* | 7/2004 | Lin | 40/546 |
| 2005/0242607 A1 | 11/2005 | Neumann | |
| 2008/0143132 A1* | 6/2008 | Okuda | 296/1.08 |
| 2010/0148530 A1 | 6/2010 | Michler | |
| 2011/0205736 A1* | 8/2011 | Lee et al. | 362/237 |

FOREIGN PATENT DOCUMENTS

| | | |
|---|---|---|
| DE | 102005036533 A1 | 2/2007 |
| EP | 2028048 A1 | 2/2009 |
| FR | 2912095 A1 | 8/2008 |
| GB | 2418170 A | 3/2006 |
| WO | 2004024510 A1 | 3/2004 |
| WO | 2006062514 A2 | 6/2006 |
| WO | 2008113446 A1 | 9/2008 |

* cited by examiner

DECORATIVE ELEMENT AND METHOD FOR PRODUCTION THEREOF AND METHOD FOR ACTUATING THE SAME

The invention relates to a decorative element, in particular for an interior trim component of a motor vehicle, to a method for the production of such a decorative element and to a method for actuating such a decorative element.

Such decorative elements for enhancing the attractiveness of trim components of motor vehicles are generally known. DE 10 2004 060 810 A1 discloses such a decorative element wherein a transparent plastic material is applied to a decorative film in an in-mould decoration process. This design permits the backlighting of the decorative element by a light source or the use of the decorative element as a cover for a headlamp or a part of a glazing unit.

This restricted application is a disadvantage of known decorative elements. To improve the appearance of the interior of a motor vehicle, it is particularly expedient if decorative elements can be applied almost anywhere and if attractive visual effects can be obtained under different active and passive lighting conditions. Decorative elements known from prior art are, however, not capable of meeting these conditions.

The present invention is therefore based on the problem of further developing a decorative element of the type referred to above in such a way that its use allows for an increased latitude in design. The invention is further based on the problem of providing a method for the production of such a decorative element.

This problem is solved by a decorative element comprising an at least partially transparent decorative film (12) applied to a flat carrier element (30) and back injection molded with two plastic layers (14, 16). At least the first plastic layer (14) is thereby at least partially transparent. The use of the first plastic layer (14) as an optical conductor is thereby made possible, allowing particularly optically attractive light coupling into the decorative element, and opening particularly extensive latitude in design.

Such a decorative element is in particular designed for an interior trim component of a motor vehicle and comprises an at least partially transparent decorative film applied to a flat carrier element. A first layer of a transparent plastic material is placed between the carrier element and the decorative film. According to the invention, it is provided that a second layer of a further plastic material is placed between the carrier element and the first layer. The provision of a second plastic layer behind the transparent plastic layer in the sequence of layers permits a more extensive modulation of the optical properties of the decorative element. The second layer can in particular provide the transparent plastic layer with light-conducting properties, so that a great variety of visual effects can be obtained irrespective of prevailing lighting conditions. Even without an active lighting of the decorative element, a three-dimensional depth effect can for example be achieved, which gives the decorative element a particularly attractive appearance.

In a further development of the invention, it is provided that light from a light source can be coupled into the first layer. In this case, the decorative element does, in contrast to decorative elements known from prior art, not have to be backlit, because the transparent plastic layer is provided with an optical waveguide-type function by the second plastic layer. It is for example possible to distribute light which has been coupled in laterally across the decorative element in a homogeneous way through surface lines. This allows for particularly space-saving applications of the decorative element in combination with a laterally positioned light source. Such decorative elements can of course alternatively be backlit in the known way.

In a particularly preferred embodiment, the light source has at least two different selectable emission spectra. This allows for additional visual effects which may either meet purely aesthetic requirements or even endow the decorative element with additional functions as indicating elements for an operating status of an associated device.

In a further development, the first layer comprises at least one coupling-out element for coupling out light in an emission direction extending substantially in the direction of a face normal of the decorative film. In this way, light which is either coupled in laterally by a light source or enters the first layer in the form of ambient light by penetrating the decorative film can be coupled out of the first layer in a controlled manner. This allows for a brightness profile across the surface of the decorative element, which further increases latitude in the design of the decorative element. In a particularly preferred variant, the first layer comprises a plurality of coupling-out elements, so that light can be coupled out variably in a location-dependent manner from the first layer. The coupling-out elements are preferably formed by thickenings or notches of the first layer. The distribution of brightness across the first layer is therefore exclusively the result of its geometric design. There is no need for additional elements which would have to be fitted to the decorative elements as separate components. This simplifies the production of such a decorative element and makes it particularly cost-effective.

In a further development of the invention, the sequence of layers includes a structural layer with a surface texture behind the first layer—i.e. on that side of the first layer which is remote from the decorative film. This, too, allows for additional visual effects which increase latitude in the design of such a decorative element.

In a further development of the invention, a further decorative film is provided which is directly joined to the first decorative film. This, too, allows for visual effects which would not be achievable with a single decorative film, for example the superimposition of different symbols, or the formation of interference effects or designs having a three-dimensional effect.

The decorative films are preferably printed on the side facing the first layer and/or on the side which is remote from the first layer. Direct printing on the decorative film allows for the implementation of a multitude of patterns using the simplest of production technologies. Such decorative elements are in particular designed for use for an interior trim of a motor vehicle. The applications for such decorative elements are, however, not limited to automotive engineering. It is in particular possible to use decorative elements of the type described above in furniture and the like in order to give such products a particularly attractive appearance.

The invention further relates to a method for the production of a decorative element for an interior trim of a motor vehicle, wherein a decorative film is first provided and shaped by thermoforming. Following the thermoforming process, a first layer of an at least partially transparent plastic material is applied to the decorative film in an in-mould decoration process. When this layer is set, a second layer of a further plastic material can be applied to the first layer in an in-mould decoration process, using the same or another mould. In the last step, finally, a carrier component of the interior trim is applied to the second layer, likewise using an injection moulding process. As all plastic layers of the decorative element are injection-moulded, there is no need for further joining means such as adhesion promoters or adhesives. The result is a particularly durable decorative element which can be produced by simple means. By using multi-component injection moulds, such a decorative element can ideally be produced in a single mould without any need for removing an intermediate product from the mould and transferring it to another mould. The method is therefore particularly fast and, as a result, cost-effective.

In decorative elements having their own light source for lighting the decorative element, it is further possible to provide further functions beyond the purely aesthetic functions. The invention therefore further relates to a method for actuating a lit decorative element for an interior trim of a motor vehicle, which comprises an at least partially transparent decorative film behind which is provided an at least partially transparent layer of a plastic material into which light can be coupled via a light source. This layer further comprises at least one coupling-out element for coupling out light from the layer in an emission direction extending substantially in the direction of a face normal of the decorative film. One essential characteristic of the method according to the invention is the coupling of the decorative element to a driver assistance system, so that an emission characteristic of the light source is changed in dependence on information transmitted by the driver assistance system. With the method according to the invention, additional information on the current driving state of the vehicle can be transmitted to the driver with a minimum of distraction. It is in particular possible to activate or deactivate the light source in dependence on this information. As an alternative or in addition, an emission spectrum of the light source can be altered in dependence on the information of the driver assistance system. A single decorative element can therefore, using the method according to the invention, transmit a variety of information, which may for example be distinguished by colour coding. This results in a particularly simple and non-distracting design of the motor vehicle cockpit, which allows the driver to concentrate optimally on the current driving situation.

The invention and its embodiments will be explained in greater detail below with reference to the drawings. Of the drawings.

Figure 1:
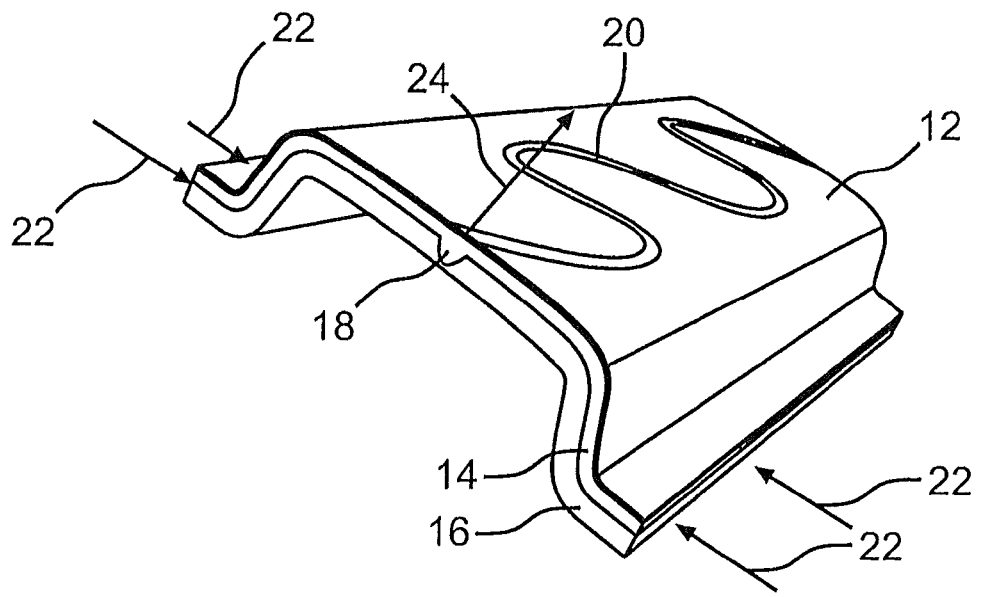
FIG. 1 is a perspective view of an embodiment of a decorative element according to the invention.

A decorative element identified as a whole by the reference number 10 comprises a film 12 to which a transparent plastic layer 14 is applied in an in-mould decoration process. On the side of the plastic layer 14 which is remote from the decorative film, a further plastic layer 16, which is not transparent in this case, is applied. In section, the transparent plastic layer has a contour, the transparent layer 14 being thicker in a sub-region 18. This controlled design of the transparent plastic layer 14 results, in the top view of the decorative element 10, in a decorative structure 20 with a three-dimensional depth effect. To enhance this effect, light can be coupled into the transparent plastic layer 14 in the direction of the arrows 22, i.e. laterally. The layer guides the light in the manner of an optical waveguide by surface reflection. Owing to its thickening, the region 18 acts as a coupling-out element, so that light is coupled out from the transparent plastic layer 14 in the direction of arrow 24 in the region of the decorative structure 20. The light therefore emerges substantially in the direction of a surface normal onto the surface of the decorative film 12.

Different kinds or types of light sources may be used. It may in particular be provided that a light source with a controllable illumination level is used. Individual lighting elements may also be used for a varying illumination of the illuminated region, or individual regions may be illuminated individually, partially or together. For this purpose, individually selectable LEDs may in particular be used, in different colours if required. The intensity of the light can also be controlled by way of the dimensioning of the optical waveguide, for example in terms of the shape, depth or size of the notch.

Figure 2:
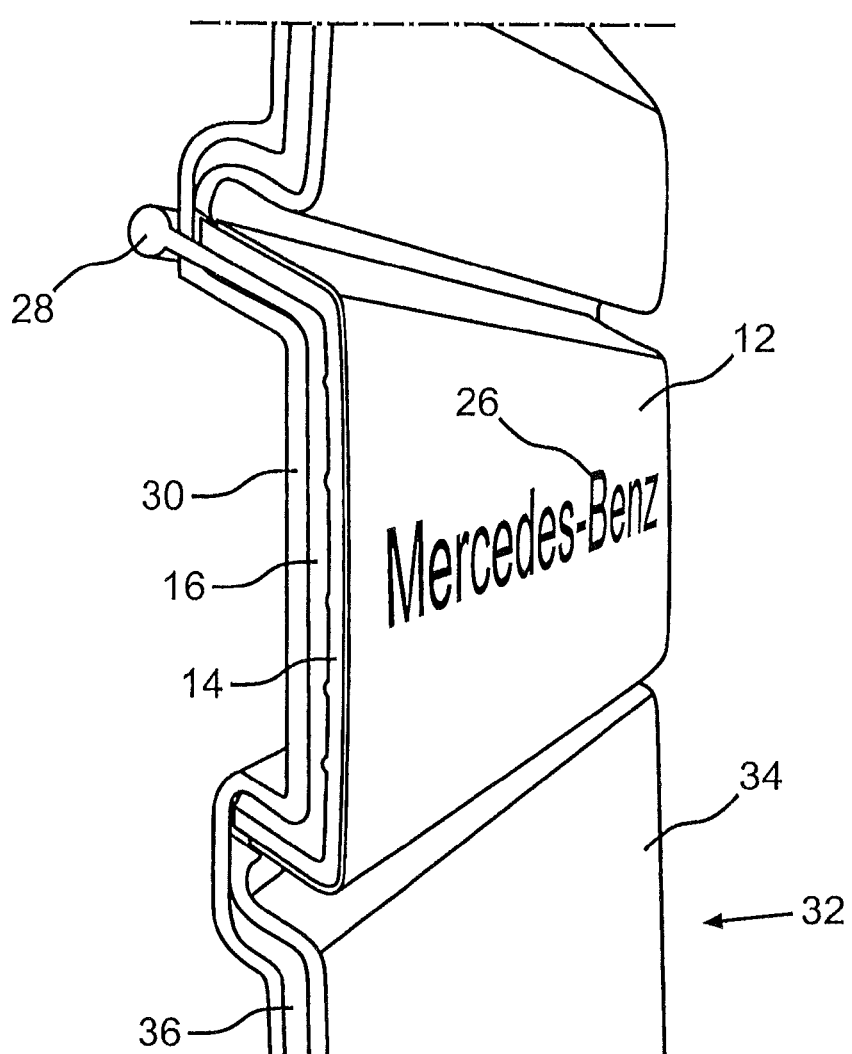
FIG. 2 is a perspective view of an alternative embodiment of a decorative element according to the invention.
Figure 3:
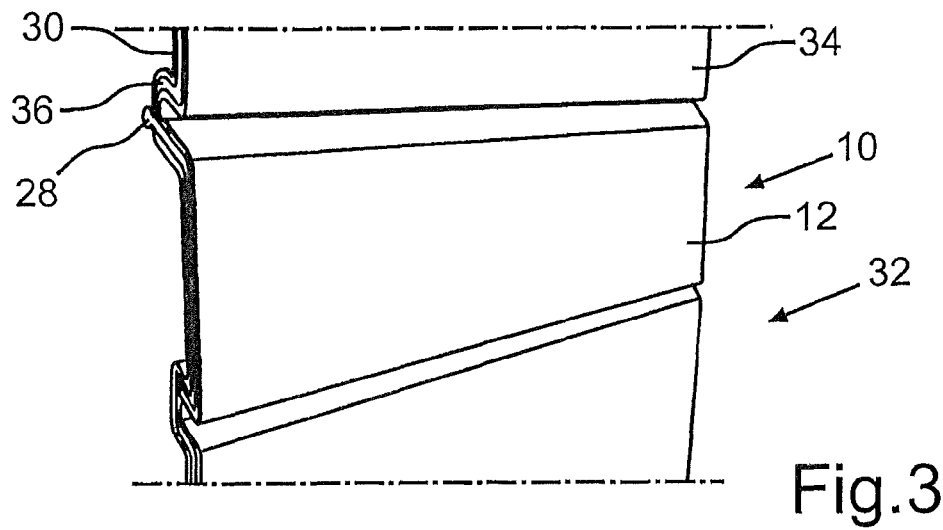
FIG. 3 is a perspective view of a further alternative embodiment of a decorative element according to the invention with backlighting.
Figure 4:
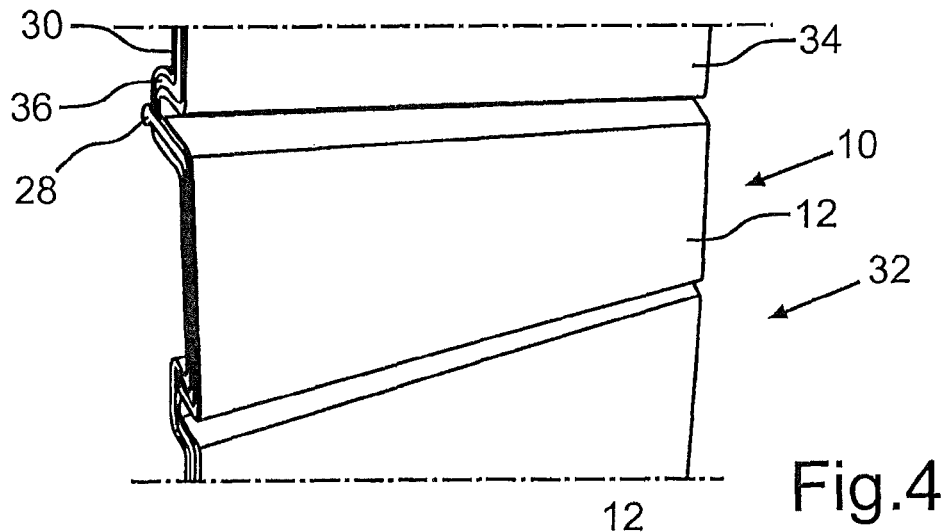
FIG. 4 shows the decorative element from FIG. 3 with the lighting deactivated.

Apart from purely geometrical designs, which are exclusively effected by the structure of the transparent plastic layer 14, additional design elements may be provided. Such a variant can for example be seen in FIG. 2. For this purpose, the film 12 is printed on each driver and/or rear side with a lettering 26, which can again be backlit by a light coupled into the transparent plastic layer 14 by a light source 28. Behind the second plastic layer 16, a carrier part 30 of the trim component 32 is applied in an in-mould decoration process, so that the decorative film 12 is directly integrated into the trim component 32. In the regions of the trim component 32 adjacent to the decorative film 12, an external shaped skin 34 is provided, which is joined to the carrier 30 via a polyurethane foam layer 36. As FIGS. 3 and 4 show, additional visual effects can be achieved by activating or deactivating the light source. Special surface effects can be obtained by means of the design of the decorative film 10. It is for example possible to design this as a plastic film, as a metal foil or sheet with openings, as a natural fibre material modified for injection moulding, as a knitted fabric or as a leather part.

Figure 5:
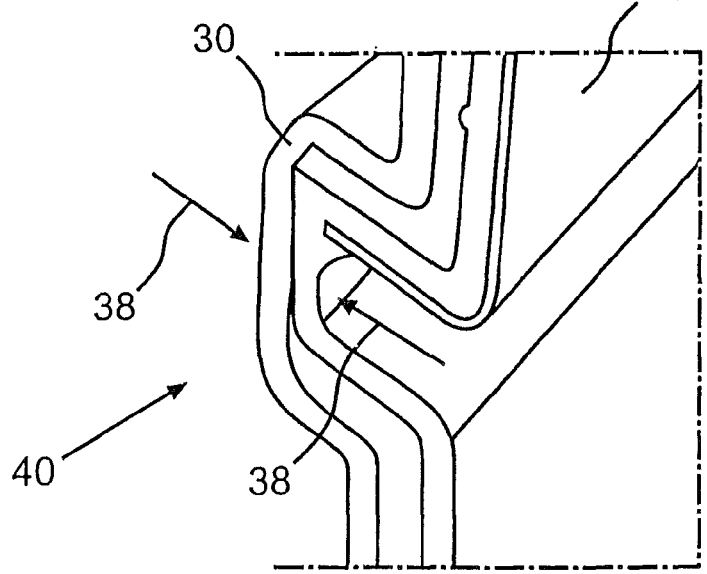
FIG. 5 is a detailed view of the transitional region between the decorative element and the interior trim component for the embodiments from FIGS. 3 and 4.

By applying a suitable bias when moulding the skin or the carrier, a lateral force may, as shown in FIG. 5, be applied to the edge region 40 of the decorative film 12 along the arrows 38, resulting in an automatic sealing of the decorative element 10. It may also be sealed by means of an adhesive.

Figure 6:
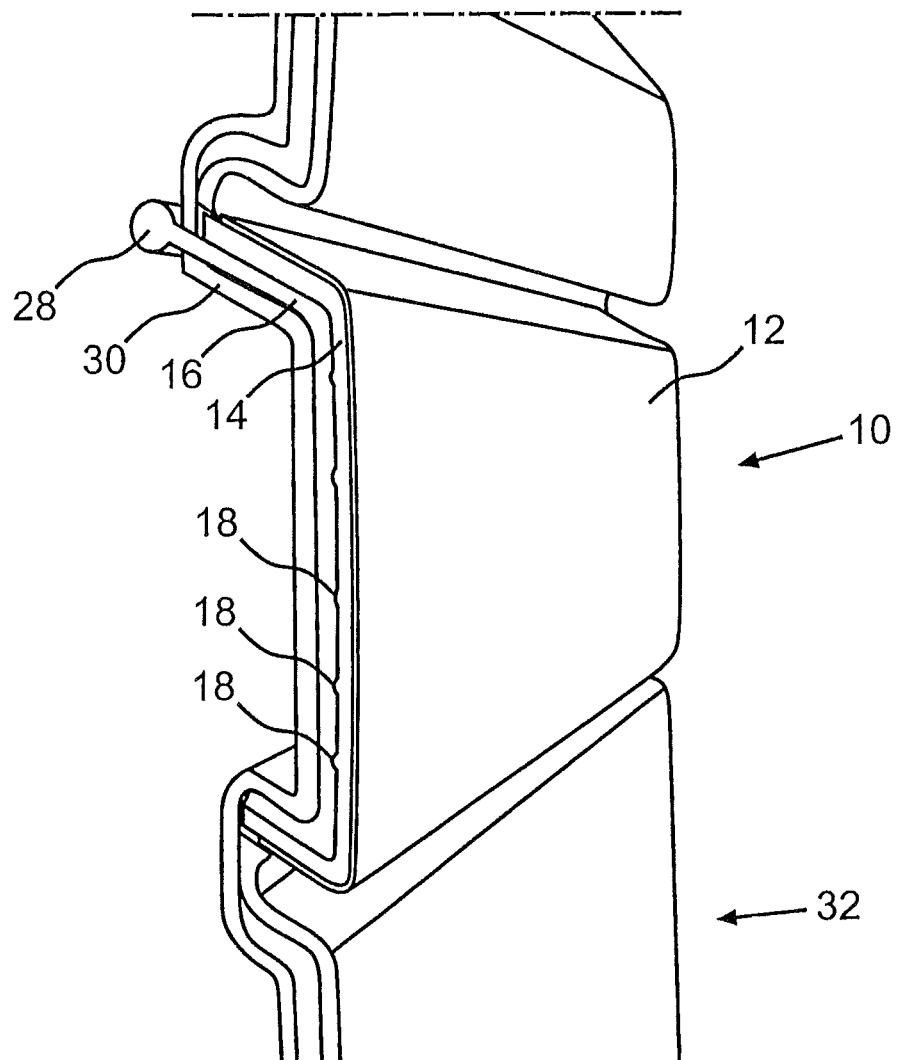
FIG. 6 is a cut perspective view of a further alternative embodiment of a decorative element according to the invention.
Figure 7:
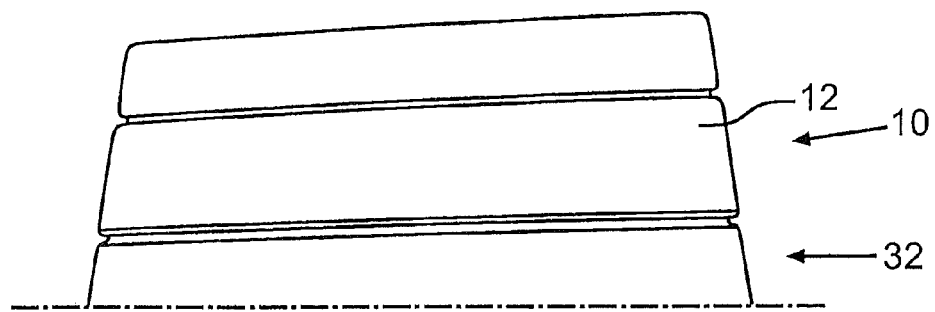
FIG. 7 is a top view of a further embodiment of a decorative element according to the invention.

As FIG. 6 shows, an additional effect can be obtained by using two decorative films on top of each other. This gives the design element a three-dimensional appearance, which is enhanced further by the thickened regions 18 of the transparent plastic layer 14 in the embodiment shown in FIG. 6. By a suitable progression of the thickness of the transparent plastic layer 14, a corresponding progression of brightness can be achieved across the decorative film 12 as shown in FIG. 7, resulting in the illustrated embodiment in a fade-out effect of the lettering printed on the decorative film 12.

Figure 8:
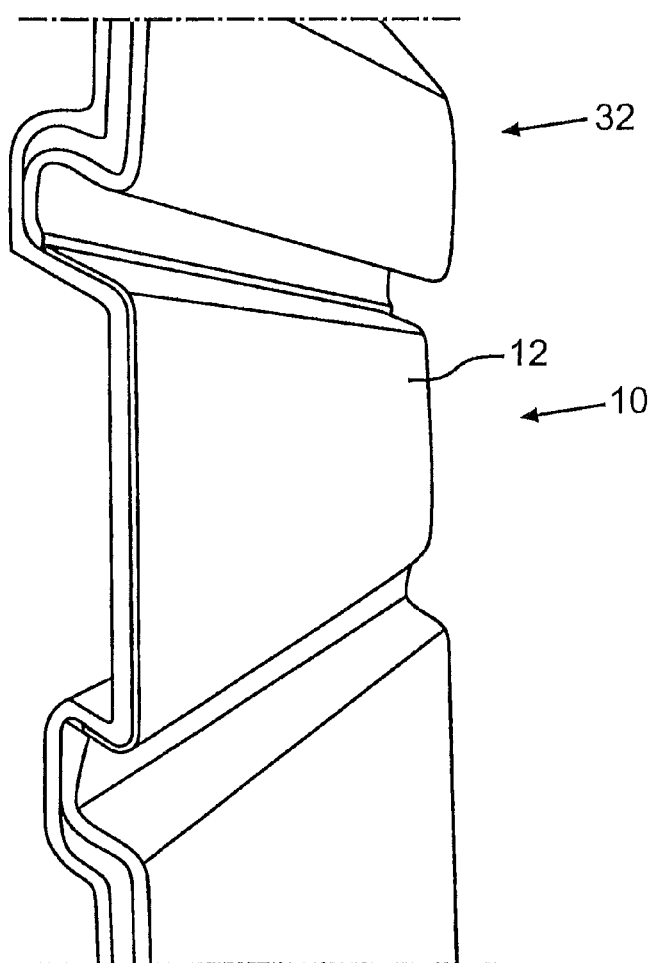
FIG. 8 is a cut perspective view of a further embodiment of a decorative element according to the invention.

In addition to the illustrated lettering, geometrical or pictorial patterns can of course be shown on the decorative film, as shown in FIG. 8. The example shown in FIG. 8 does not require any backlighting of the decorative film 12. The effect is achieved by printing the decorative film 12 on both sides, with a background colour on the rear side of the decorative film 12 and the pattern itself on the front of the decorative film 12.

Figure 9:
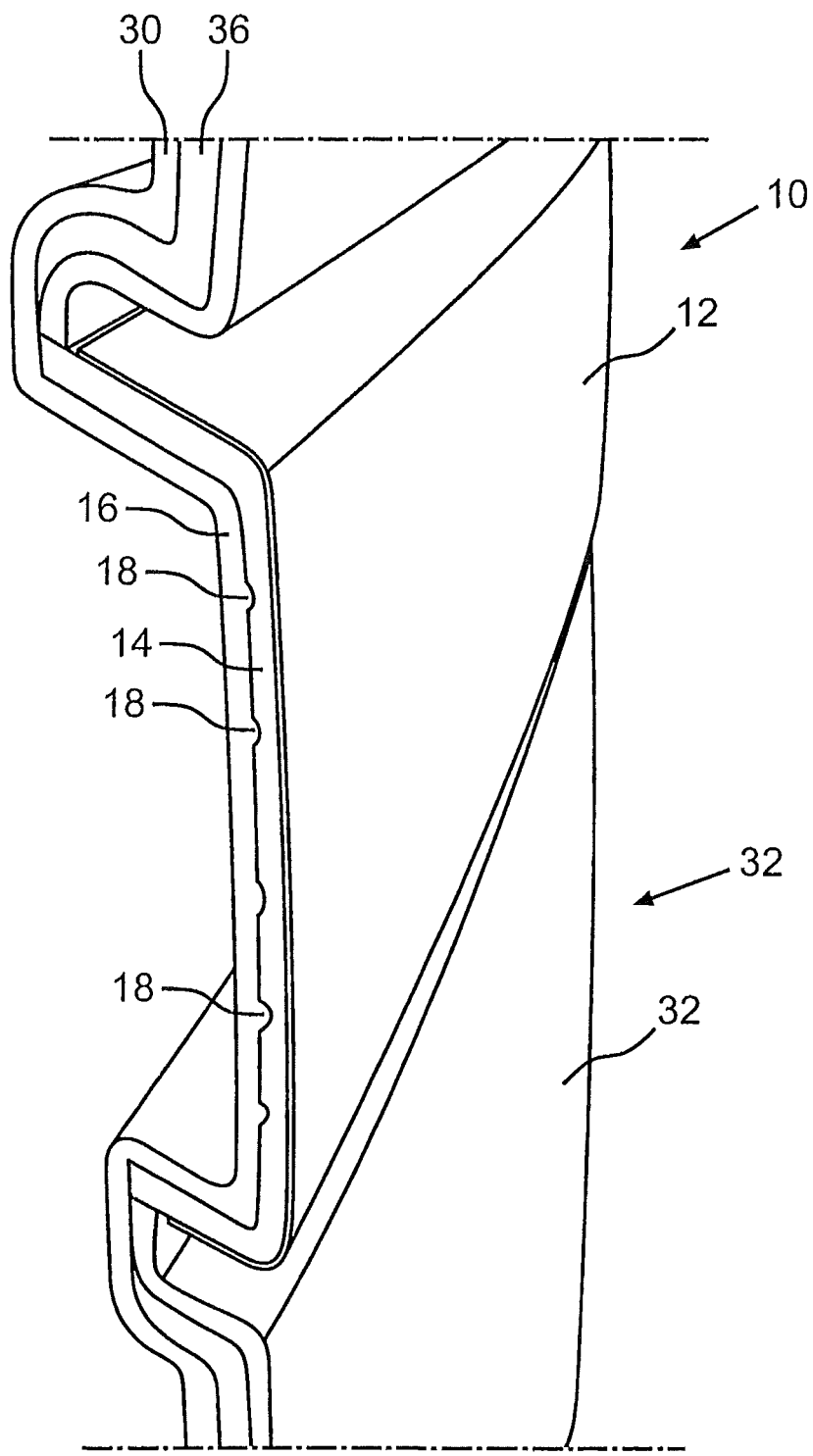
FIG. 9 is a cut perspective view of a further embodiment of a decorative element according to the invention.

In this case, too, constant or variable backlighting may obviously be used. Even transparent and only partially coloured decorative films are, in combination with a suitable geometrical design of the plastic layers 14, 16, capable of providing interesting visual effects, as for example shown in FIG. 9. By providing thickened regions 18 which extend along the length of the decorative element 10, a stripe pattern is created which provides an attractive three-dimensional effect in ambient light only, i.e. without using a dedicated light source. The second plastic layer directly merges into the carrier.

Figure 10:
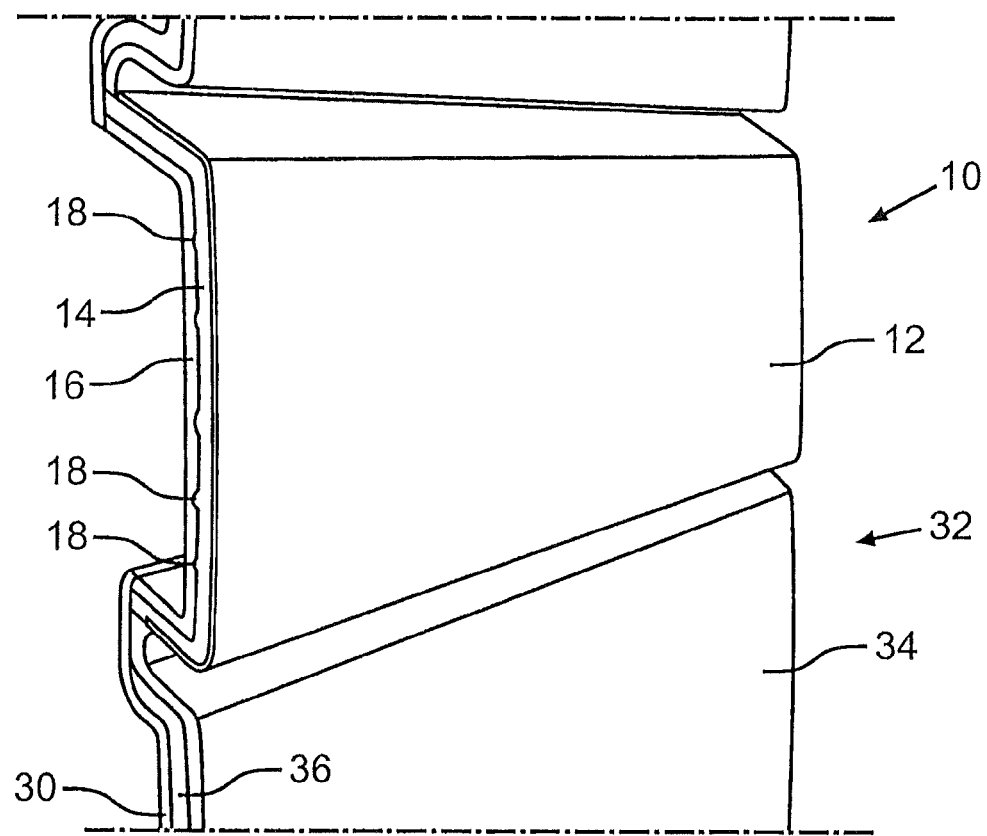
FIG. 10 is a cut perspective view of a further embodiment of a decorative element according to the invention.
Figure 11:
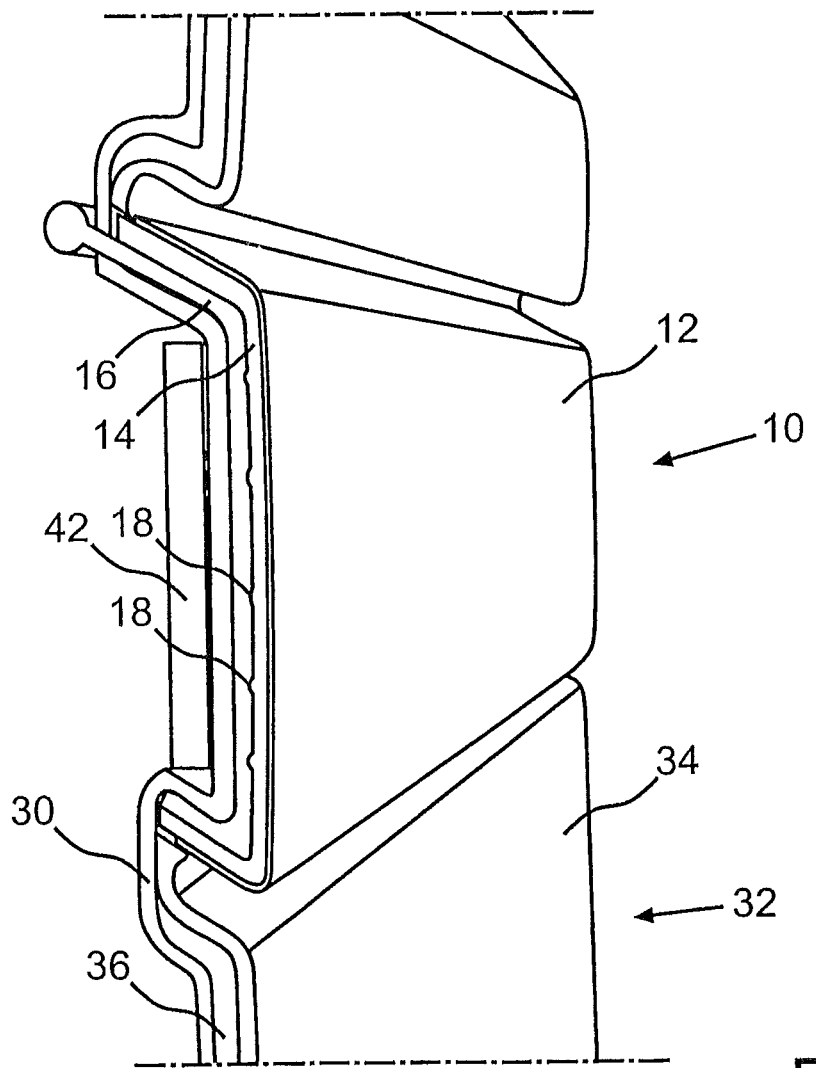
FIG. 11 is a cut perspective view of a further embodiment of a decorative element according to the invention.

In addition to the lateral illumination of the transparent plastic layer 14 as shown above, conventional backlighting can be used a shown in FIG. 10. The carrier material 30 is discontinuous in the region of the second plastic layer 16, which is likewise transparent. A light source is placed behind the decorative element 10. Even with direct backlighting, the first plastic layer 14 may be provided with reinforced regions 18 which generate the light colour in the direction of the surface normal of the decorative film 12, thereby providing additional attractive effects. Additional effects may also be obtained by placing structural materials 42 in the region behind the decorative film 12. The structural material 42 in the embodiment shown in FIG. 11 has a textured, fabric-type surface and is placed behind the carrier 30 of the trim component 32 in the illustrated embodiment. In the region of the decorative element 10, openings are provided in the carrier 30, so that the structural element 42 can be seen through the transparent plastic layers 14, 16 and through the likewise transparent decorative film 12. As in the embodiments described above, thickened regions 18 are provided in the first plastic layer, which contribute to the formation of linear structures with a three-dimensional effect. One advantage of the invention lies in the fact that a great variety of geometrical structures can be formed.

Figure 12:
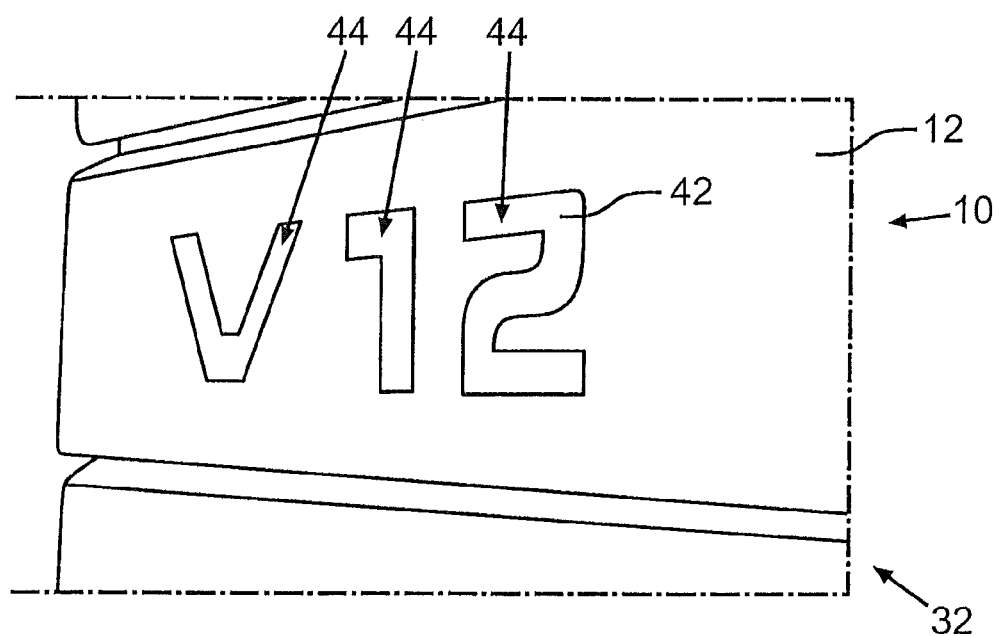
FIG. 12 is a top view of a further embodiment of a decorative element according to the invention with a structure material behind the transparent plastic layer.

FIG. 12 is another top view of the same embodiment, which shows the textile-style textured surface of the structural element 42 particularly clearly; this can be seen through openings 44, which may be through-openings, of the carrier part 30.

Figure 13:
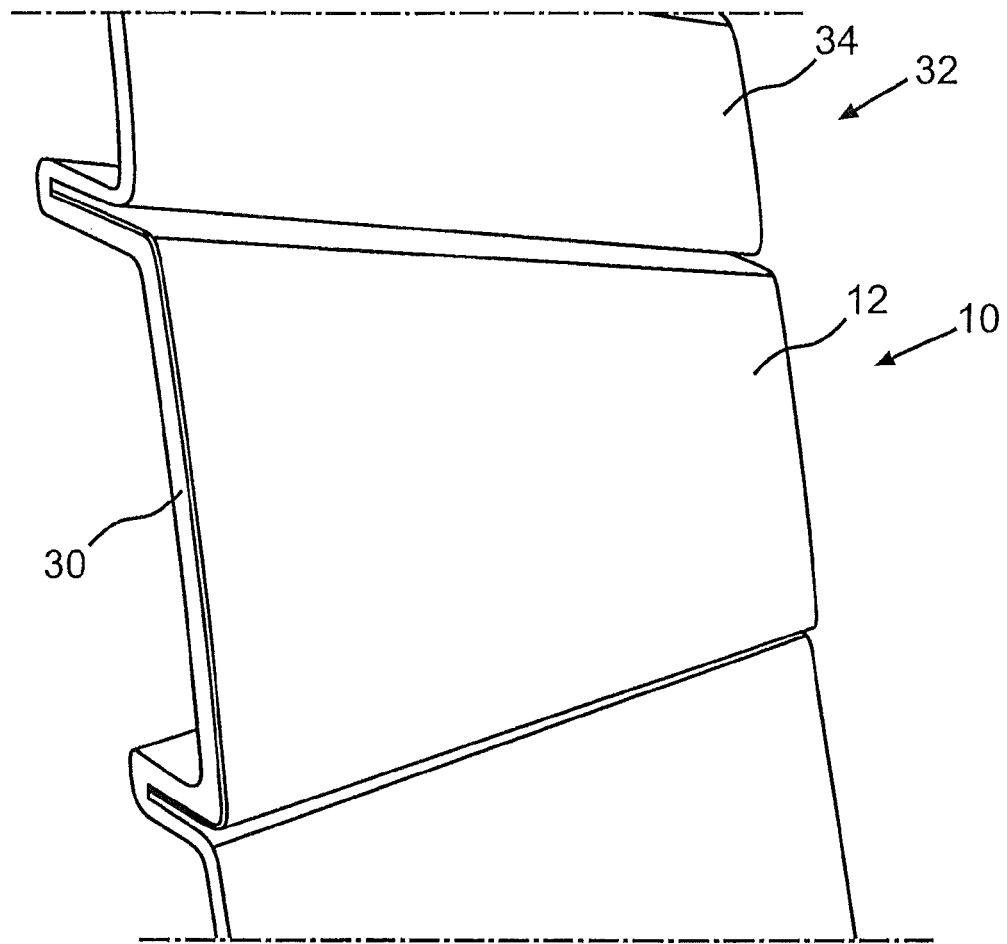
FIG. 13 is a cut perspective view of a further embodiment of a decorative element according to the invention.

FIG. 13 finally shows a further embodiment in which a symmetrical pattern of the decorative film 12 is highlighted by backlighting. The backlighting is once again implemented by means of through-openings in the carrier 30 of the trim component 32. As an alternative, a partially transparent plastic material can be used instead of the through-openings.

Figure 14A:
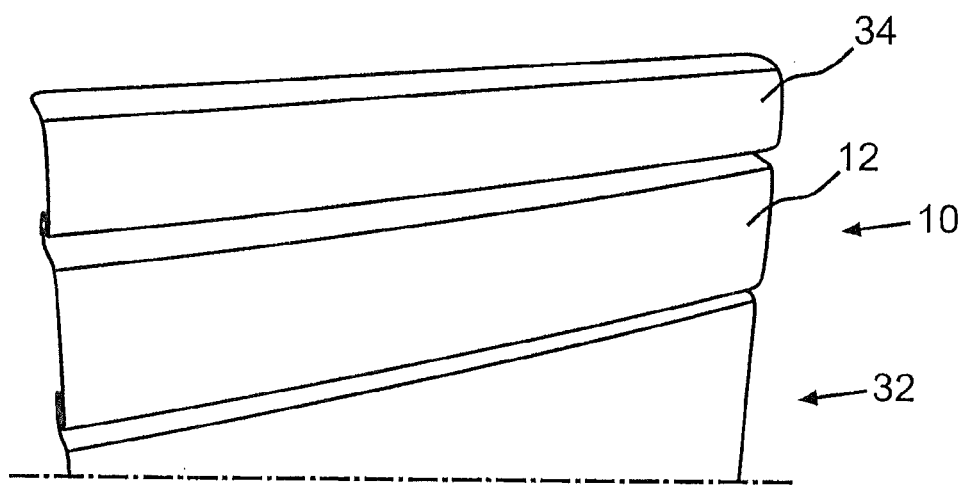
FIG. 14 is a top view of a further embodiment of a decorative element according to the invention with additional indicating function.
Figure 14B:
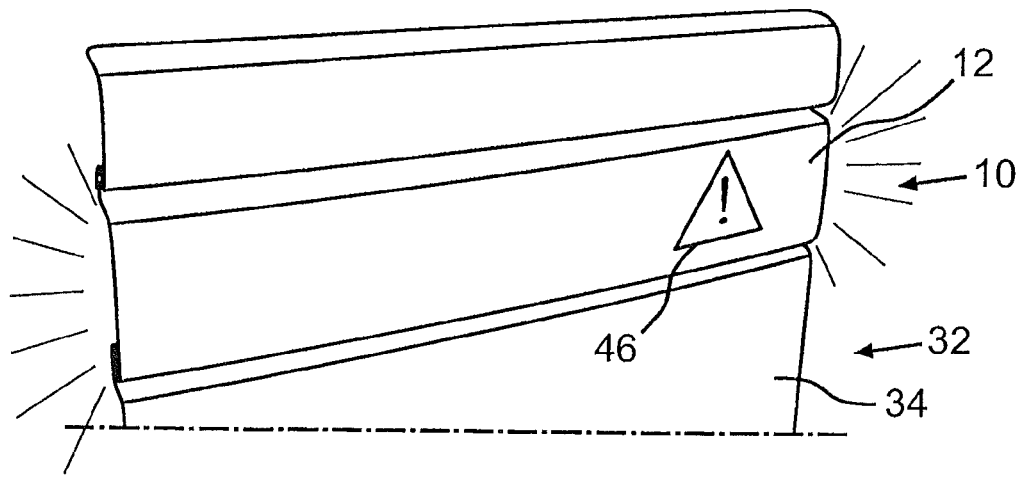

In a particularly interesting development, decorative elements 10 have an indicating function in addition to their decorative function. This is illustrated in FIGS. 14A and B. If the light source is deactivated or the decorative element is trans-illuminated only partially as shown in FIG. 14A, only a neutral surface can be seen in the region of the decorative film 12. The backlighting or the lateral coupling-in of light for the decorative element 10 can in the illustrated embodiment be activated by a driver assistance system. In certain operating conditions of the vehicle, a warning symbol 46 can be displayed on the decorative element 10. In this way, a driver assistance system can for example inform the driver about vehicles in his blind spot. An alternative application would be the integration of such a decorative element 10 into a door lining, so that a warning symbol would be displayed if there are objects in the pivoting range of the opening door.

In addition to the transmission of information by activating or deactivating a lighting of the decorative element 10, it is possible to vary the shade or the brightness of the decorative element 10 in dependence on information transmitted by the driver assistance system. An example for this would be the monitoring of the fuel consumption of the motor vehicle. If the driver exceeds a previously set consumption limit owing to a particularly aggressive driving style, the decorative element could for example be backlit in red. If, on the other hand, fuel consumption remains in the desired range, green backlighting could be provided. By integrating decorative and indicating functions into one and the same element, particularly clear and non-distracting cockpits can be created. This has a positive effect on traffic safety.

LIST OF REFERENCE NUMBERS

10 Interior trim component
12 Decorative film
14 First layer
16 Second layer
18 Coupling-out elements
24 Emission direction
28 Light source
30 Carrier element
32 Interior trim component
34 Shaped skin
36 Polyurethane foam layer
38 Arrows
40 Edge region
42 Structural layer
44 Openings
46 Warning symbol

The invention claimed is:

1. A decorative element (10) suitable for use as an interior trim component (32) of a motor vehicle, comprising an at least partially transparent decorative film (12) applied to a flat carrier element (30), wherein a first layer (14) of a transparent plastic material is placed between the carrier element and the decorative film (12), into which first layer (14) light can be coupled from a light source (28), wherein a second layer (16) of a further plastic material is provided between the carrier element (30) and the first layer (14) and the light source (28) is placed at the side of the first layer (14) and in the layer sequence behind the first layer (14).

2. The decorative element (10) according to claim 1, wherein the light source (28) has at least two different selectable emission spectra.

3. The decorative element (10) according to claim 1, wherein the first layer (14) comprises at least one coupling-out element (18) for coupling out light in an emission direction extending substantially in the direction of a surface normal of the decorative film (12).

4. The decorative element (10) according to claim 3, wherein the first layer (14) comprises a plurality of coupling-out elements (18) for coupling out light variably in a location-dependent manner in an emission direction (24) extending substantially in the direction of the surface normal of the decorative film (12).

5. The decorative element (10) according to claim 1, wherein the coupling-out elements (18) are represented by thickenings or notches of the first layer (14).

6. The decorative element (10) according to claim 1, wherein a further decorative film (12) which is directly joined to the first decorative film (12) is provided.

7. The decorative element (10) according to claim 1, wherein the decorative films (12) are printed on the side facing the first layer (14) and/or on the side remote from the first layer (14).

8. A use of a decorative element (10) according to claim 1 for an interior trim of a motor vehicle or for a piece of furniture.

9. A method for the production of a decorative element (10) for an interior trim (32) of a motor vehicle, comprising the following steps:
 a) providing a decorative film (12),
 b) thermoforming the decorative film (12),
 c) applying a first layer (14) of an at least partially transparent plastic material to the decorative film (12) in an in-mould decoration process,
 d) applying a second layer (16) of a further plastic material to the first layer (14) in an in-mould decoration process,
 e) applying a carrier part (30) of the interior trim (32) to the second layer (16) in an in-mould decoration process.

10. A method for actuating a lit decorative element (10) for an interior trim (32) of a motor vehicle, which decorative element comprises an at least partially transparent decorative film (12) behind which is placed at least one partially transparent layer (14) of a plastic material, the method comprising:
 providing a light source (28) for coupling light into the layer and at least one coupling-out element (18) for coupling light out of the layer (14) in an emission direction (24) extending substantially in the direction of a surface normal of the decorative film, and
 altering the emission characteristic of the light source (28) in dependence on information transmitted by a driver assistance system.

11. The method according to claim 10, wherein the light source (28) or an emission spectrum of the light source (28) is activated and/or deactivated in dependence upon the information.

* * * * *